United States Patent [19]

Marasco et al.

[11] Patent Number: 6,149,102
[45] Date of Patent: Nov. 21, 2000

[54] MOUNTING SYSTEM FOR AUXILIARY FUEL TANK

[75] Inventors: John Richard Marasco, Mesa; James R. Van Horn, Scottsdale, both of Ariz.

[73] Assignee: Robertson Aviation LLC, Tempe, Ariz.

[21] Appl. No.: 09/047,758

[22] Filed: Mar. 25, 1998

[51] Int. Cl.[7] .................................................. B64D 37/00
[52] U.S. Cl. .................................. 244/135 R; 244/13 B; 410/100
[58] Field of Search ............................. 244/135 B, 118.1, 244/137.1, 131, 118.2, 135 R; 248/154, 500, 505; 410/12, 50, 20, 96, 97, 100

[56] References Cited

U.S. PATENT DOCUMENTS

| | | | |
|---|---|---|---|
| 3,383,078 | 5/1968 | Shoet et al. | 244/135 R |
| 3,528,687 | 9/1970 | Underwood | 244/135 B |
| 3,665,866 | 5/1972 | Swanson | 410/96 |
| 3,843,078 | 10/1974 | Schon et al. | 244/135 B |
| 4,214,721 | 7/1980 | Burhans, Jr. et al. | 244/135 B |
| 4,311,213 | 1/1982 | Desjardins et al. | 188/380 |
| 4,676,463 | 6/1987 | Tansill | 244/135 B |
| 4,860,972 | 8/1989 | Lannerd et al. | 244/135 R |
| 5,338,136 | 8/1994 | Hetchler | 410/100 |
| 5,451,015 | 9/1995 | Cronkite et al. | 244/135 R |
| 5,915,652 | 6/1999 | Caldwell et al. | 244/121 |
| 6,007,024 | 12/1999 | Stephan | 244/118.1 |
| 6,010,286 | 1/2000 | Cross et al. | 410/129 |

OTHER PUBLICATIONS

Article from the Arizona Business Gazette, v112,n27, p.1(2), Jul. 3, 1992.
Article from the Aerospace Daily, Oct. 17, 1997, p. 95, vol. 184, No. 12.

*Primary Examiner*—Peter M. Poon
*Assistant Examiner*—Judith A. Nelson
*Attorney, Agent, or Firm*—Parsons & Goltry; Robert A. Parsons; Michael W. Goltry

[57] ABSTRACT

A mounting system includes a restraint pan into which an auxiliary fuel tank is placed, a harness extending over the fuel tank, and a pair of brackets each having a corner receptacle for engaging a corner of the fuel tank. The corner receptacles are each reinforced by a gusset. Each bracket includes two arms having a pair of holes that align with each other. The first holes receives a bolt, making a pivoting joint between the arms and the second holes receive a removable pin for aligning the two arms in a locked position. Each end of the brackets is a clevis for engaging a cargo ring. The harness includes a pair of straps interconnected by a web and ratchets for tightening the straps. The pan prevents horizontal movement of the fuel tank, the harness resists vertical movement of the fuel tank, and the brackets prevent vertical motion and tipping motion of the fuel tank.

8 Claims, 3 Drawing Sheets

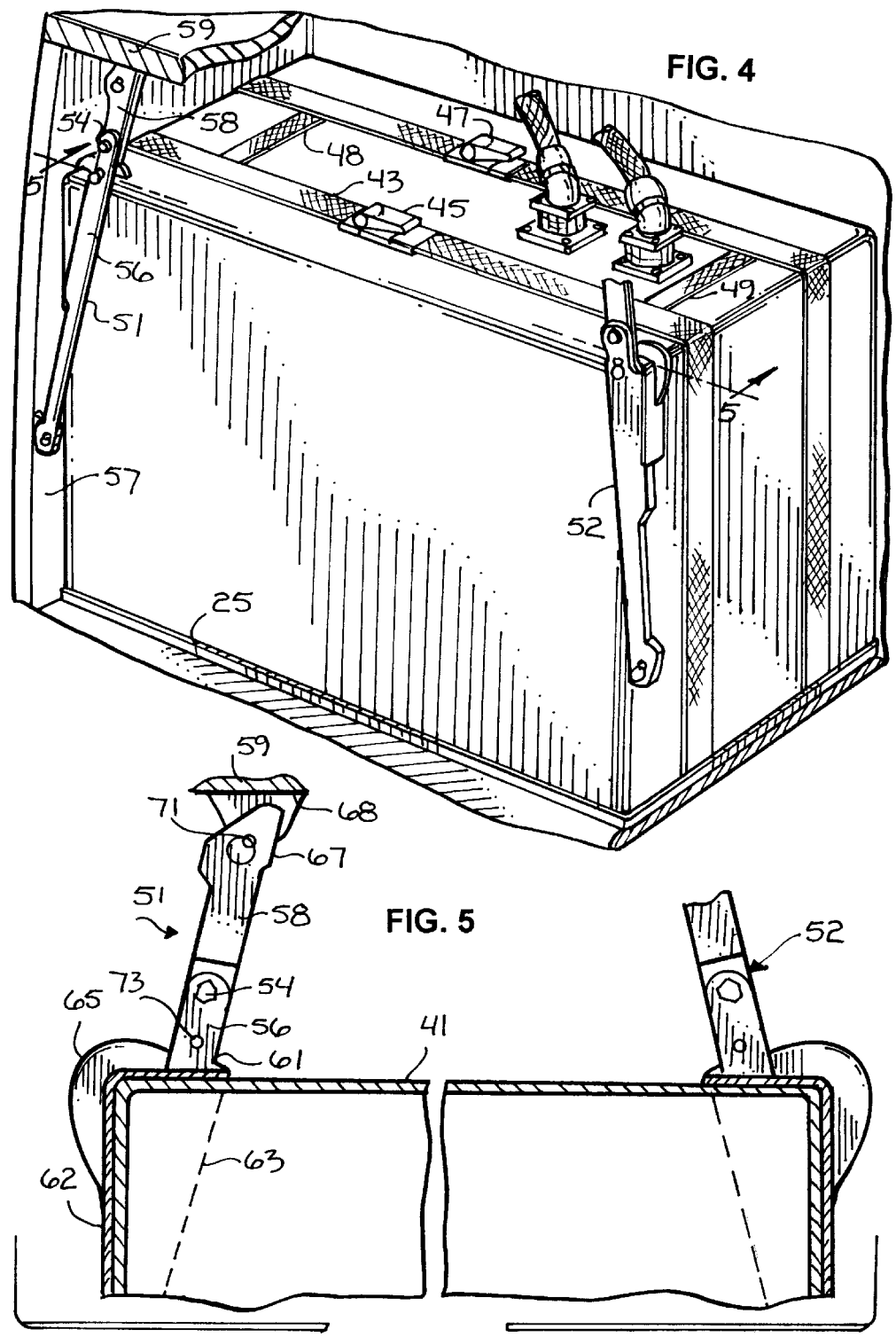

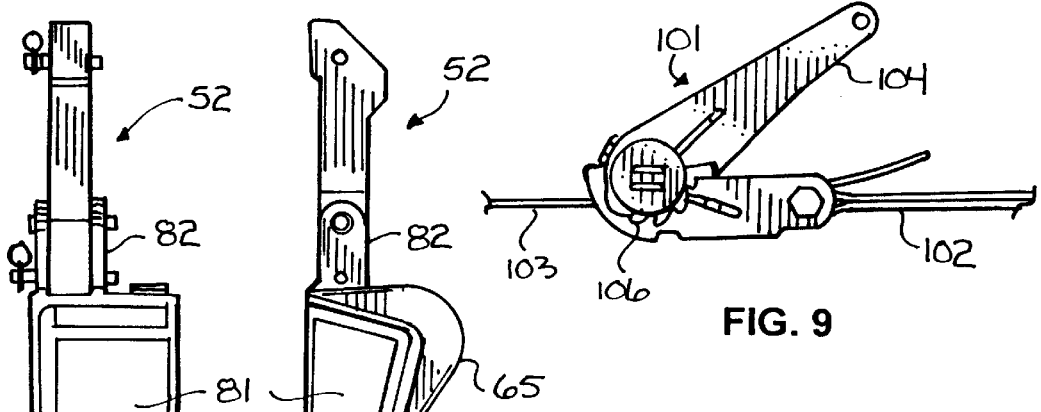
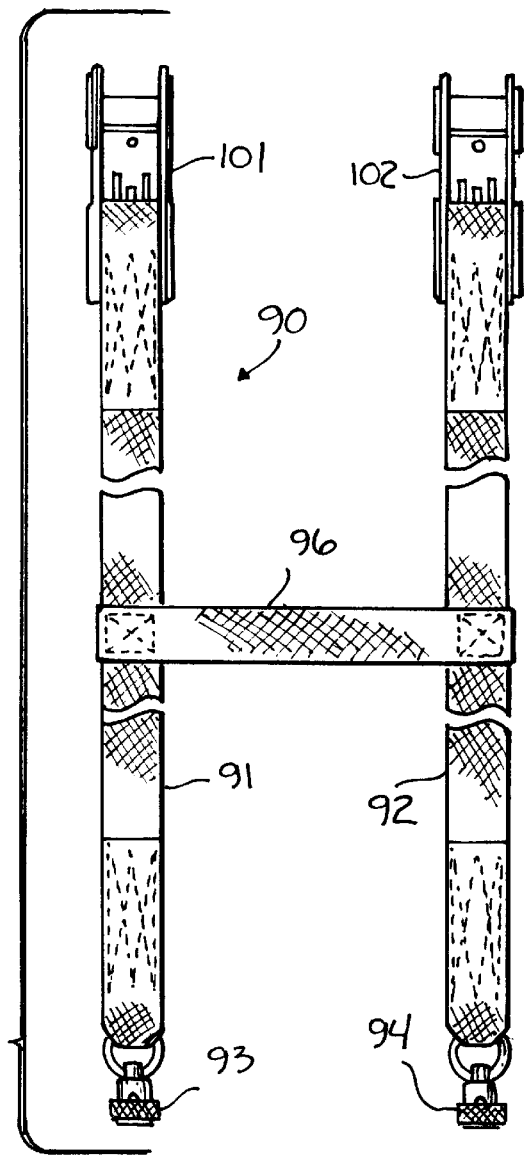
FIG. 6 FIG. 7 FIG. 8 FIG. 9

MOUNTING SYSTEM FOR AUXILIARY FUEL TANK

BACKGROUND OF THE INVENTION

This invention relates to auxiliary fuel systems and, in particular, to a mounting system for a crash worthy, auxiliary fuel system for a helicopter.

Auxiliary fuel tanks have long been used to extend the range of a helicopter and other aircraft or to provide refueling capability at a remote location. Depending upon the size and type of helicopter, auxiliary fuel tanks have been located in pods outside the helicopter, under seats, in cargo bays, and elsewhere. For some applications, e.g. surveillance or patrol, an added fuel tank may be an essentially permanent installation. For rescue or other operations, it is desirable that an auxiliary fuel tank be easily installed or removed in order to re-configure a helicopter as quickly as possible; e.g. in ten minutes or less.

A problem with many of these installations is that the system is not crash worthy. As used herein, a "crash worthy" fuel system is one that will not leak fuel when subjected to an impact that human passengers are likely to survive. Although there are many variables that affect the severity of an impact, the abrupt application of a force in excess of twenty "g's" (twenty times the force of gravity) is generally considered the upper limit of a survivable crash.

The conflicting requirements of crash worthiness and ease of installation or removal are difficult to meet simultaneously, particularly when the fuel tank is large, e.g. holding one hundred ninety-five gallons of fuel (thirteen hundred pounds) or more. Ease and speed of installation or removal implies that there are relatively few parts, that the parts are easily handled by male or female personnel, and that installation or removal requires no tools. Not requiring any tools is especially important if the fuel tanks are removed or installed in remote locations, rather than at a local airport.

In order for a fuel tank to be crash worthy, fuel must be contained in such a way that stress is distributed as uniformly as possible over the surface of the fuel tank. A crash worthy fuel tank includes a crash worthy bladder within a resilient fiberglass case. During impact, the bladder and case may distort but do not fail. Fasteners attached directly to the case are not practical because of the localized stress imposed by the fasteners. Fuel line fittings include break-away, self-sealing connectors to avoid imposing a breaking stress on the fuel line during a crash.

In general, a crash worthy fuel tank contains the fuel. What is needed is a mounting system for containing the tank in such a way that the combination is crash worthy. Preferably, the system for mounting the fuel tank does not require significant modification of the helicopter, which could complicate the installation of other equipment, such as seats, stretchers, and the like, when an auxiliary fuel tank is not installed.

In view of the foregoing, it is therefore an object of the invention to provide a crash worthy mounting system for an auxiliary fuel tank in a helicopter.

Another object of the invention is to provide a mounting system for an auxiliary fuel tank that does not require modification of the helicopter for installation.

A further object of the invention is to provide a mounting system for an auxiliary fuel tank that does not require extensive modification of the fuel tank.

Another object of the invention is to provide a mounting system for an auxiliary fuel tank that enables the tank to be installed or removed quickly and without the use of tools.

SUMMARY OF THE INVENTION

The foregoing objects are achieved in this invention in which the mounting system includes a restraint pan into which the fuel tank is placed, a harness extending over the fuel tank, and a pair of brackets each having a corner receptacle for engaging a corner of the fuel tank. The corner receptacles are each reinforced by a gusset. Each bracket includes two arms having a pair of holes that align with each other. The first hole receives a bolt, making a pivoting joint between the arms and the second holes receive a removable pin for aligning the two arms in a locked position. Each end of the brackets is a clevis for engaging a cargo tie-down ring (known as a "hard point") on a helicopter. The harness includes a pair of web straps interconnected by ratchets for tightening the straps. The pan prevents horizontal movement of the fuel tank, the harness prevents vertical movement of the fuel tank, and the brackets prevent vertical motion and a tipping motion of the fuel tank.

BRIEF DESCRIPTION OF THE DRAWINGS

A more complete understanding of the invention can be obtained by considering the following detailed description in conjunction with the accompanying drawings, in which:

FIG. 4 is a partial cut-away view of an auxiliary fuel tank restrained by a mounting system constructed in accordance with the invention;

FIG. 5 is a partial cross-section illustrating the attachment of the upper portion of a bracket constructed in accordance with the invention;

FIG. 6 is a side view of a bracket constructed in accordance with the invention;

FIG. 7 is a back view of a bracket constructed in accordance with the invention;

FIG. 8 is a plan view of a harness constructed in accordance with the invention; and FIG. 9 is a side view of a ratchet mechanism for tightening a belt in the harness.

DETAILED DESCRIPTION OF THE INVENTION

Figure 1:
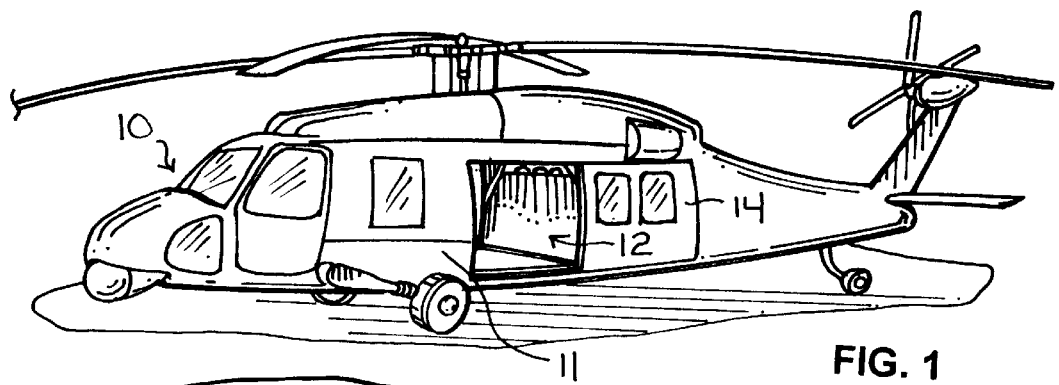
FIG. 1 illustrates a helicopter having a cargo bay that can hold one or two auxiliary fuel tanks.

In FIG. 1, helicopter 10 includes fuselage 11 defining cargo area 12. Sliding door 14 closes the opening in the left-hand side of fuselage 11 and another door (not shown in FIG. 1) closes an opening in the right-hand side of the fuselage. Cargo area 12 extends fore and aft of the doorways to provide a substantial volume for cargo or passengers.

Figure 2:
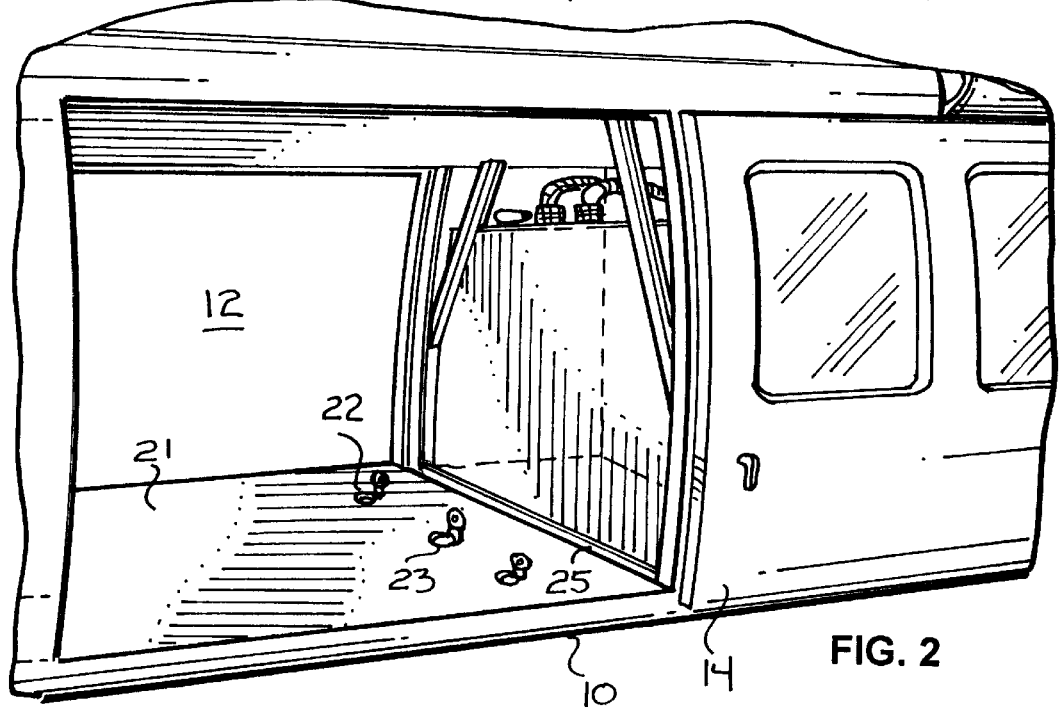
FIG. 2 illustrates the cargo bay with an auxiliary fuel tank, shown in phantom, contained by a mounting system constructed in accordance with the invention.

In FIG. 2, cargo area 12 includes floor 21 having a plurality of anchors such as anchors 22 and 23 for securing seats, cargo, or other articles to the floor. Floor 21 also includes a plurality of recesses for receiving a variety of fasteners. Anchors 22 and 23 are circular rings secured to the floor by a hinge that enables the circular rings to be tipped up for attaching ropes or belts and laid flat in a recess when not in use.

Figure 3:
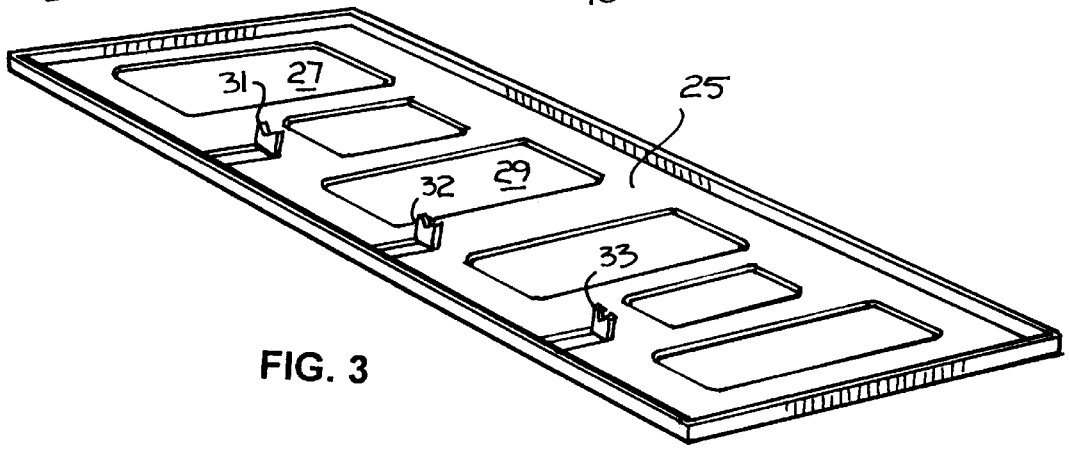
FIG. 3 is a perspective view of a restraint pan constructed in accordance with the invention.

Restraint pan 25 is shown in the aft portion of cargo area 12 in FIG. 2 and is illustrated in greater detail in FIG. 3. Pan 25 includes a flat bottom having a plurality of apertures such as aperture 27 and aperture 29, for reducing the weight of the pan. Pan 25 preferably includes a wall attached to the bottom and extending up from the bottom approximately 1 and ½ inches as measured from the top of the side wall to the bottom inside surface of the pan 25. Pan 25 is preferably machined from a single slab of aluminum that is milled out to leave a bottom thickness of ½ inch and a wall thickness of approximately ¼ inch. The inside and outside corners where the walls merge with the bottom are preferably radiused to reduce stress.

Pan 25 includes latches 31, 32, and 33 located above corresponding anchors in floor 21 (FIG. 2) of helicopter 10. Latches 31 are designed to fit around the circular rings or the anchors attached to floor 21. The small, upwardly extending tabs illustrated in FIG. 3 lie flat within an opening to trap the circular ring within the pan. This provides a low profile, secure mechanism for attaching pan 25 to floor 21 of helicopter 10. The number of anchors depends upon the design of the helicopter. Three anchors have been used to secure the restraint pan for a two hundred gallon auxiliary fuel tank. The inside, radiused corners of pan 25 are designed to have approximately the same radius of curvature as the fuel tank being secured. Pan 25 restrains motion of tank 41 in a horizontal direction (fore and aft, side to side) with the helicopter positioned as shown.

After restraint pan 25 is attached to the helicopter, the empty, or essentially empty, fuel tank is then put into place and coupled to the fuel system of the helicopter by suitable self-sealing break-away valves and other crash worthy hardware. FIG. 4 illustrates an auxiliary fuel tank held in place by a mounting system constructed in accordance with the invention. Specifically, auxiliary fuel tank 41 rests within restraint pan 25 after the pan has been attached to the floor of the cargo bay. Harness 43 extends from fittings (not shown) in the floor of the helicopter, up one side of fuel tank 41, across the top of the tank, and down the opposite side of the fuel tank to additional fittings in the floor. Ratchets 45 and 47 provide a mechanism for tightening harness 43. Webs 48 and 49 prevents the long straps from separating under stress. Harness 43 resists vertical motion of the fuel tank.

Brackets 51 and 52 further enclose fuel tank 41 and prevent the fuel tank from tipping forward or moving vertically out of restraint pan 25. Brackets 51 and 52 have a mirror symmetry or handedness such that the brackets are adapted to fit adjoining corners of fuel tank 41; that is, corners having two sides in common. Bracket 51 is constructed as two arms of unequal length connected by bolt 54, about which the two parts of the bracket can pivot. Lower arm 56 has the free end thereof anchored in side wall 57 of the helicopter and upper arm 58 has the free end hereof anchored in ceiling 59 of the helicopter.

FIG. 5 illustrates the construction of the upper portion of bracket 51 in greater detail. Lower arm 56 includes plate 61 resting on the top of tank 41, plate 62 extending along a portion of the side of the fuel tank, and plate 63 extending across the front of the corner of the fuel tank. Gusset 65 extends around plates 61 and 62 and is orthogonal to both plates, strengthening both plates. Lower arm 56, plates 61–63, and gusset 65 are preferably milled from a single billet of aluminum. Alternatively, the components are welded to lower arm 56.

The upper end of upper arm 58 includes clevis 67 straddling cargo ring 68, which is attached to ceiling 59 of the helicopter. Pin 71 extends through a hole in clevis 67 and a hole in cargo ring 68 for securing upper arm 58 to ceiling 59. Pin 71 is longer than clevis 67 is wide and is secured by a retractable ball (not shown) protruding from the pin on the opposite side of the clevis from the side illustrated in FIG. 5. The upper end of bracket 52 is similarly constructed, except that the parts are oriented for enclosing an adjoining corner of fuel tank 41.

Brackets 51 and 52 are preferably attached to the walls and ceiling of the helicopter with the upper arm bent relative to the lower arm. After lower arm 56 is in place, upper arm 58 is straightened relative to the lower arm and hole 73 becomes aligned with a hole (not shown in FIG. 5) in upper arm 58. When the holes are aligned, a second pin (not shown) is inserted through the holes, locking the lower arm relative to the upper arm. The lower end (not shown) of lower arm 56 also includes a clevis for receiving a cargo ring attached to the wall of the helicopter. Thus, no tools are necessary for inserting or removing brackets 51 and 52. The pins that are used for fastening are stored with the brackets when the brackets are not in use.

FIG. 6 is a side view of bracket 52 and FIG. 7 is a back view of bracket 52. The brackets are preferably made from 6061-T351 aluminum alloy or type 6061-T6511 aluminum alloy. In one embodiment of the invention, the brackets were made from a billet 4⅜" by 5" by 31⅜" long and the gussets were made from stock having a thickness of 1¼" and the size of approximately 5⅜" square. The plates forming corner receptacle 81 have a thickness no less than 0.330 inches. Clevis 82 has a height of approximately 2½" and a wall thickness no less than ½" for each side of the U. Recesses 84 and 85 leave a material thickness no less than ½" inch extending the length of lower arm 87. The recesses lighten the bracket and the walls of the recesses provide ample stiffening. As can be seen from FIGS. 6 and 7, brackets 51 and 52 are robust and provide a crash worthy containment system for an auxiliary fuel tank.

FIG. 8 illustrates a harness constructed in accordance with the invention for securing an auxiliary fuel tank to a helicopter. Harness 90 includes strap 91 and strap 92, each of which extends from a floor fitting up the side of the fuel tank, across the top, and down the other side to another floor fitting. Fitting 93, at the end of strap 91, fits into a suitable receptacle in the floor of the helicopter. Fitting 94, at the end of strap 92, similarly fits another receptacle in the floor of the helicopter. Fittings 93 and 94 include rings for receiving the ends of straps 91 and 92, which pass through the rings and are then sewn to the strap. Harness 90 includes web 96 connected strap 91 to strap 92. Harness 90 includes several such webs (not shown) for limiting the distance that straps 91 and 92 will spread under stress.

Straps 91 and 92 are not continuous but are constructed in two halves interconnected by a ratchet for tightening the straps. Ratchet 101 is attached to strap 91 and ratchet 102 is attached to strap 92. Ratchet 101 is shown in a side view in FIG. 9. In FIG. 9, ratchet 101 is permanently attached to strap segment 102 and engages strap segment 103 with a suitable gripping mechanism. Ratchet 101 further includes handle 104 for actuating pawl 106, or other escapement mechanism, for moving segment 103 through ratchet 101, thereby tightening the strap.

The harness thus provides a mechanism for securing an auxiliary fuel tank to a helicopter without the need for tools. The harness provides a somewhat resilient but secure fastening for the fuel tank. The fuel tank itself is constructed with a case containing a self-sealing bladder, both of which can expand and distort during a crash. Harness 90 provides a mechanism for permitting the fuel tank to expand or distort slightly without tearing loose.

The invention thus provides a crash worthy mounting system for an auxiliary fuel tank in a helicopter. The mounting system does not require modification of the helicopter for installation and does not require modification of the fuel tank. The mounting system enables an auxiliary tank to be installed or removed within approximately ten minutes without the use of tools.

Having thus described the invention, it will be apparent to those of skill in the art that various modifications can be made within the scope of the invention. For example, although described in connection with a single auxiliary fuel tank, more than one tank can be secured. A tank not located next to a bulkhead is secured with four brackets instead of two brackets. Although the brackets are illustrated as positioned at an angle of approximately 15° from the vertical, the angle is not critical and depends, in part, upon the design of the helicopter and a desire to keep the bracket relatively short and, therefore, easily handled. A vertical bracket or a horizontal bracket would be too long. A bracket at an angle of 45° might interfere with access to the fuel fittings.

What is claimed as the invention is:

1. In an aircraft having a cargo area, there is provided a mounting system for mounting an auxiliary fuel tank, said mounting system comprising:
   a restraint pan adapted to be attached to an aircraft for restraining horizontal movement of a fuel tank;
   a harness having a length sufficient to extend over the fuel tank for resisting vertical movement of the fuel tank; and
   a pair of brackets each adapted to be mounted diagonally between the ceiling and a wall of the aircraft for restraining vertical motion and tipping motion of the fuel tank, each bracket including a corner receptacle for engaging a corner of the fuel tank.

2. The mounting system as set forth in claim 1 wherein each bracket includes a gusset for reinforcing said corner receptacle.

3. The mounting system as set forth in claim 1 wherein each bracket includes:
   a first arm;
   a second arm attached to the first arm by a pivoting joint and including a hole through the second arm a predetermined distance from said joint;
   wherein the first arm includes a portion extending along the second arm past the joint and includes a hole in the portion;
   wherein the hole in the second arm aligns with the hole in said portion when the first arm and the second arm are in a first position; and
   a pin extending through the hole in the second arm and the hole in said portion to lock the arms in said first position.

4. The mounting system as set forth in claim 1 wherein each bracket includes:
   a pair of ends wherein each end is a clevis for engaging a cargo ring on said aircraft.

5. The mounting system as set forth in claim 1 wherein said harness includes:
   at least one strap having a length between ends;
   wherein each end includes a fitting for attachment to the aircraft; and
   a ratchet along said length for adjusting the length of said strap.

6. The mounting system as set forth in claim 5 wherein said harness includes a pair of straps interconnected by a web for preventing the straps from separating.

7. The mounting system as set forth in claim 1 wherein said restraint pan includes a bottom and sidewalls for engaging said fuel tank to prevent horizontal movement of the fuel tank.

8. The mounting system as set forth in claim 7 wherein said restraint pan includes a plurality of latches for fastening the pan to said aircraft.

\* \* \* \* \*